United States Patent [19]

Young

[11] Patent Number: 4,512,813

[45] Date of Patent: Apr. 23, 1985

[54] METHOD FOR TREATING WOODEN ARTICLES

[75] Inventor: Donald C. Young, Fullerton, Calif.

[73] Assignee: Union Oil Company of California, Los Angeles, Calif.

[21] Appl. No.: 482,942

[22] Filed: Apr. 7, 1983

Related U.S. Application Data

[63] Continuation-in-part of Ser. No. 455,317, Jan. 3, 1983, , and a continuation-in-part of Ser. No. 455,268, Jan. 3, 1983, , and a continuation-in-part of Ser. No. 442,296, Nov. 17, 1982, , and a continuation-in-part of Ser. No. 444,667, Nov. 26, 1982, , and a continuation-in-part of Ser. No. 453,282, Dec. 27, 1982, , and a continuation-in-part of Ser. No. 453,496, Dec. 27, 1982.

[51] Int. Cl.[3] .......................... B08B 3/08; B29C 17/08

[52] U.S. Cl. .......................................... 134/27; 134/42; 156/668; 427/308; 427/325

[58] Field of Search .................... 134/27, 42; 252/79.4; 156/668; 427/397, 308, 325; 144/364, 380

[56] References Cited

U.S. PATENT DOCUMENTS

| | | | |
|---|---|---|---|
| 1,340,708 | 5/1920 | Fjellanger | 71/28 |
| 1,717,947 | 6/1929 | Snyder | 156/668 X |
| 2,302,594 | 11/1942 | Berliner et al. | 427/397 |
| 2,414,808 | 1/1947 | Hamill | 144/380 |
| 4,063,003 | 12/1977 | Hartman | 427/397 X |
| 4,108,226 | 8/1978 | Bornstein | 144/380 |
| 4,116,664 | 9/1978 | Jones | 71/549 |
| 4,214,888 | 7/1980 | Young | 71/28 |
| 4,315,763 | 2/1982 | Stoller et al. | 71/29 |
| 4,318,343 | 1/1982 | Verdegaal et al. | 71/28 |
| 4,397,675 | 11/1981 | Young | 71/28 |
| 4,402,852 | 12/1981 | Young | 252/182 |
| 4,404,116 | 12/1981 | Young | 252/182 |
| 4,445,925 | 11/1981 | Young | 71/28 |
| 4,447,253 | 11/1981 | Young | 71/28 |

OTHER PUBLICATIONS

Sarkaria et al., *Chem. Abstracts,* vol. 81, 1974, pp. 138–139, (Abstract No. 171832z).

Taisho Pharm. Co. Ltd., *Chem. Abstracts,* vol. 98, Jun. 1982, p. 67, (Abstract No. 5745e).

Miyamichi et al., *Chem. Abstracts,* vol. 77, 1972, p. 66, (Abstract No. 127988y).

D. F. du toit, Verslag Adad. Wetenschappen, 22, 573–574, (abstracted in Chemical Abstracts, 8, 2346, (1914).

L. H. Dalman, "Ternary Systems of Urea and Acids., I. Urea, Nitric Acid and Water., II. Urea, Sulfuric Acid and Water., III. Urea, Oxalic Acid and Water",JACS, 56, 549–53, (1934).

Sulfur Institute Bulletin No. 10, (1964), "Adding Plant Nutrient Sulfur to Fertilizer".

Donald C. Young, U.S. patent application Ser. No. 455,268, filed Jan. 3, 1983, for Cellulosic Compositions and Methods for Treating Cellulosic Materials.

*Primary Examiner*—Marc L. Caroff

*Attorney, Agent, or Firm*—Dean Sandford; Gregory F. Wirzbicki; Michael H. Laird

[57] ABSTRACT

The monourea adduct of sulfuric acid, when combined with water, has the unique ability to ablate the surface of wooden articles without charring or otherwise disfiguring the surface of the wooden article. Thus, wooden articles can be treated to accomplish a variety of purposes by contacting the surface to be treated with a composition containing the monourea adduct of sulfuric acid. Such compositions comprise mixtures of urea and sulfuric acid in which the molar ratio of urea to sulfuric acid is within the range of $\frac{1}{4}$ to about 7/4 so that at least about 25 percent of the sulfuric acid is present as the monourea adduct. Such treatment can be employed to modify the dimensions of the article surface, remove stains, mars or other markings, accentuate the hard grain of the article surface, emboss the surface with a predetermined pattern, or accomplish other objectives that result from generally or selectively ablating the article's surface.

19 Claims, No Drawings

METHOD FOR TREATING WOODEN ARTICLES

RELATED APPLICATIONS

This application is a continuation-in-part of my co-pending applications Ser. No. 455,317, "Plant Seed Compositions and Methods for Treating Plant Seeds", filed Jan. 3, 1983; Ser. No. 455,268, "Cellulosic Compositions and Methods for Treating Cellulosic Materials", filed Jan. 3, 1983; Ser. No. 442,296, "Systemic Herbicidal Compositions and Methods of Use", filed Nov. 17, 1982; Ser. No. 444,667, "Methods for Controlling Vegetation", filed Nov. 26, 1982; Ser. No. 453,282, "Method for Selectively Controlling Plant Suckers", filed Dec. 27, 1982; Ser. No. 453,496, "Acid Catalyzed Reactions and Compositions for Use Therein", filed Dec. 27, 1982.

BACKGROUND OF THE INVENTION

1. Field of the Invention

This invention relates to the treatment of wooden articles and, in particular, it relates to methods useful for ablating at least a portion of the surface of wooden articles and thereby modifying the dimensions of the article's surface, and/or cleaning, embossing, or otherwise modifying the surface of wooden articles.

2. Description of the Art

The surfaces of a variety of wooden articles are often treated, either chemically or mechanically, to modify the article's dimensions, accentuate grain structure, emboss the surface or clean the article, prepare the surface for further use such as adhesion to another wooden article for the formation of composite structures such as laminates, furniture or other wooden structures, for finishing or coating with sealers, stains, paints, varnishes or other surface preparations, and a variety of other uses. Physical changes in the surfaces of wooden articles are usually achieved by mechanical means such as milling, planing, sandblasting or by the use of specialized machine or hand tools such as routers, lathes, and other specialized cutting implements. Certain chemical treatments such as treatment with strong mineral acids have also found limited application for the physical modification of the surface of wooden articles and for cleaning wooden articles to remove deposits and stains or to prepare the article surface for finishing or adhesion to another component. Stains, such as applied wood stains and chemical marks such as grease marks and the like, can be removed, to some extent, with stain removers and/or strong detergents. Surface discoloration such as that which results from the aging of redwood and cedar roofing and siding materials, can also be removed, to some extent, by chemical treatment.

Both the mechanical and chemical treating procedures which are currently employed to modify, clean and/or otherwise treat the surfaces of wooden articles suffer from certain limitations. For instance, mechanical procedures often cannot be employed to accomplish objectives that can be accomplished by chemical treatment such as cleaning a wooden surface to remove stains or to prepare the surface for finishing, gluing, etc. Furthermore, the use of mechanical woodworking unavoidably modifies the surface of the treated article in a manner characteristic of the working implement employed. Sandblasting is an effective procedure for cleaning some wooden surfaces such as exterior siding and roofing although it is cumbersome and expensive. While surfactants, solvents, and other cleaning agents are effective, to some extent, for cleaning wood surfaces or preparing such surfaces for further treatment, they are not adequate in many respects. For instance, many stains on wooden surfaces cannot be readily removed with surfactants or solvents. Such stains can be removed with strong mineral acids, such as sulfuric and nitric acids, but these materials are often undesirable due to their strong oxidizing and dehydrating activity which can mar and disfigure the wood surface.

Although combinations of urea and sulfuric acid are known, it has not been suggested that such combinations which contain the monourea adduct of sulfucic acid can be advantageously employed for treating wooden surfaces. For instance, D. F. du Toit, Verslag Akad. Wetenschappen, 22, 573–4 (abstracted in Chemical Abstracts, 8, 2346, 1914) disclosed that urea forms certain compounds with oxalic, acetic, hydrochloric, nitric and sulfuric acids. L. H. Dalman, "Ternary Systems of Urea and Acid. I. Urea, Nitric Acid and Water. II. Urea, Sulfuric Acid and Water. III. Urea, Oxalic Acid and Water"; JACS, 56, 549–53 (1934), disclosed the phase relationships between the solid phase and saturated solutions containing urea and sulfuric acid at 10° C. and 25° C. The Sulfur Institute, Sulfur Institute Bulletin No. 10 (1964), "Adding Plant Nutrient Sulfur to Fertilizer", disclosed that urea reacts with sulfuric acid to form two complexes of "urea sulfate" which are useful fertilizers. Methods of manufacturing certain combinations of urea and sulfuric acid are disclosed by Verdegaal et al. in U.S. Pat. No. 4,310,343 and by Jones in U.S. Pat. No. 4,116,664. However, neither these nor other investigators have recognized that urea-sulfuric acid compositions containing the monourea adduct of sulfuric acid are uniquely active toward the surfaces of wooden articles in a manner that renders their use particularly attractive for accomplishing various modifications of such wooden surfaces.

Accordingly, a need exists for improved processes for treating wooden surfaces, and particularly for improved processes for ablating the surface of wooden articles and for cleaning, milling, embossing, engraving, highlighting the grain structure, texturizing or shaping wooden articles and for improving the quality of wooden surfaces for subsequent treatment such as coating (painting, staining, etc.) and adhesion to form composite structures.

It is therefore a principal object of this invention to provide novel methods for treating the surface of wooden articles.

Another object of this invention is the provision of methods for ablating the surface of wooden articles.

Yet another object is the provision of methods for treating the surface of manufactured wooden articles.

Another object of this invention is the provision of methods for cleaning the surfaces of wooden articles.

Another object is the provision of methods for physically modifying the surface of wooden articles to emboss, engrave and/or texturize the surface and/or to highlight the grain structure of the wood surface.

Yet another object is the provision of methods for improving the surface quality of wooden articles prior to finishing, e.g., painting, staining, impregnation and the like.

Another object is a provision of methods for improving the surface of wooden articles prior to the adhesion of the treated wood surface to other substrates.

Other objects, aspects and advantages of this invention will be apparent to one skilled in the art in view of the following disclosure and the appended claims.

SUMMARY OF THE INVENTION

Briefly, the invention provides methods for treating the surface of wooden articles, which methods involve contacting the surface with a composition containing urea, sulfuric acid, and optionally a surfactant, in which composition the molar ratio of urea to sulfuric acid is within the range of about $\frac{1}{4}$ to about 7/4. Within this range of molar ratios, at least about 25 percent of the sulfuric acid present in the composition is in the form of the monourea adduct of sulfuric acid. The treatment should also be conducted in the presence of water which can be supplied with the urea-sulfuric acid-containing composition in the form of a solution or can be added to the wood surface either before or after application of the urea-sulfuric acid-containing component. The monourea-sulfuric acid adduct is the component of the treating compositions which is most active for the treatment of wood surfaces.

The methods of this invention enable the accomplishment of one or more of a variety of objectives, depending upon the condition of the wood surface before treatment, the preparation of the surface, and the conditions of treatment, the most important of which are the amount of the urea-sulfuric acid component employed and treatment temperatures and contact times. For instance, aged wood siding can be renewed with relatively mild treating conditions, e.g., relatively low temperatures, dosage rates and contact times while more severe treating conditions are required to ablate a significant portion of a wood surface as is required to shape, emboss, highlight the grain or significantly change the overall dimensions of the treated wooden article. Thus, by appropriate control of contacting conditions, the methods of this invention can be employed to (1) ablate the surface of wooden articles, (2) clean the wood surfaces by removal of stains such as aging discoloration, oil, ink, etc., (3) shape the wood surface by selectively ablating treated portions thereof, (4) emboss the treated area, (5) mill the wooden article to reduce its overall dimensions, (6) engrave the surface by selective application of the urea-sulfuric acid component, (7) highlight the "hard grain" of wooden surfaces which comprise both hard and soft exposed grain, (8) texturize woods, and (9) improve the quality of the wood surface for finishing by painting, staining, etc., or for adhesion to another wooden or non-wood substrate.

The methods of this invention minimize or eliminate many of the deficiencies associated with wood-treating processes presently available to the art. The described methods eliminate the need for cumbersome and sometimes complicated mechanical equipment presently employed to ablate the surface of wooden articles or to clean, shape, emboss, or otherwise physically modify the wood surface. Furthermore, the methods of this invention often can be employed to achieve the desired surface modification more expeditiously and with less expense than is involved in use of mechanical surface treating methods. The methods of this invention also minimize or eliminate many of the deficiencies associated with other chemical treating processes such as surfactant and solvent cleaning and treatment with strong mineral acids. Surfactants and solvents often do not adequately clean a given wooden surface and the strong mineral acids have several well known disadvantages: they are highly caustic and corrosive and are thus difficult to handle and they all attack woods in manners that are undesirable in most instances. For instance, sulfuric acid sulfonates, oxidizes and dehydrates woods, while nitric acid oxidizes, chars and nitrates wooden surfaces.

In contrast, the urea-sulfuric acid components employed in the methods of this invention are relatively noncorrosive to both equipment and human skin and do not attack the treated wood surface in an undesirable manner. Thus, the urea-sulfuric acid components do not degrade desirable characteristics of the treated wood surface by oxidation, sulfonation, or other reactions.

DETAILED DESCRIPTION OF THE INVENTION

This invention provides novel methods for treating the surface of wooden articles which involve contacting the surface of the wooden articles with a urea-sulfuric acid component containing the monourea adduct of sulfuric acid, and water. In the presence of water, the urea-sulfuric acid components useful in the methods of this invention partially or completely dissolve the exposed portions of the wood structure. The resulting dissolved wood can be readily removed by washing with water or other solvents. Removal of the dissolved wood material can also be facilitiated by mild agitation such as brushing, pressurized water spray, and the like.

The urea-sulfuric acid component is preferably an aqueous solution of urea and sulfuric acid in which the molar ratio of urea to sulfuric acid is within the range of about $\frac{1}{4}$ to about 7/4. Within this range of molar ratios, at least 25 percent of the sulfuric acid contained in the urea-sulfuric acid component is present as the monourea adduct of sulfuric acid. The urea-sulfuric acid component may contain one or more of a variety of other materials and, in particular, it may contain a surfactant. Surfactants increase the activity of the urea-sulfuric acid component toward wood and toward stains or other constituents of the wood surface which contain lignands or other hydrophobic substances such as fats, oils, waxes, and the like.

The methods of this invention can be employed to ablate a portion of the surface of the wooden article to which the urea-sulfuric acid component is applied. Thus these methods can be employed to accomplish a number of objectives that can be achieved by removing a portion of the surface of wooden articles. For instance, these methods can be employed to clean the surface of wooden articles, to shape articles by selective application of the urea-sulfuric acid component, to emboss the wood surface by applying the urea-sulfuric acid component in a predetermined manner, to mill or otherwise reduce the dimensions of the wood surface, to engrave insigna or other patterns into the wood surface, to highlight the grain of wood surfaces that contain both hard and soft grain wood, to texturize the surface by application of the urea-sulfuric acid component in a dispersed manner, and to improve the quality of the wood surface for finishing (painting, staining, coating, etc.) and/or for adhesion to another substrate such as wood, plastic, etc., with suitable adhesives.

The methods of this invention can be employed to ablate at least a portion of the surface of all types of wooden articles including new and used raw (unprocessed) and manufactured articles comprising any type of wood. The treated articles may consist completely of wood or can comprise composite articles of wood and other materials such as plastics, metals, glass, adhesives, resins, etc. Illustrative of the types of wood that can be treated by the methods of this invention are the so-called hard woods and soft woods (sometimes referred to as hardwoods and coniferous woods, respectively) such as pine, fir, spruce, redwood, balsa, cypress, oak, ash, maple, walnut, mahogany, teak, ironwood, and numerous other varieties.

The treated wooden articles can be either solid wood or can be a wood composite article and can be virgin (not shaped or manufactured) or manufactured. Illustrative of virgin wood articles that can be treated in accordance with the methods of this invention are driftwood, redwood burls, cypress stumps, and other naturally occurring decorative woods. Illustrative of manufactured wooden articles which can be treated in accordance with the methods of this invention include milled lumber (boards), siding, roofing (shakes, shingles, etc.), constructed articles such as furniture, boxes, building structures and the like, flooring (tongue and groove, parkay, etc.), and shaped manufactured articles such as wooden beads, balls, figurines, utensils (bowls, etc.), and the like. Composite wooden articles that can be treated in accordance with the methods of this invention include laminates and other manufactured articles of which wood is a principal component. Illustrative composite articles that can be treated in accordance with the methods of this invention include plywood, particle board, compressed board, butcherblock structures, and the like.

The surface of the wooden articles to be treated in accordance with the methods of this invention should be relatively exposed wood which is not protected with a significant amount of a hydrophobic substance such as grease, oil paint, varnish or the like. The surface, however, can be either new or used, smooth or rough finished, marred or stained, and can be shaped (sculptured, embossed, textured, etc.). Wood surfaces that are protected by a hydrophobic coating can first be washed with surfactant or solvent to remove excess oil or grease. Similarly, known chemical agents such as paint removers and appropriate solvents can be employed to remove wood finishes such as paint, varnish, shellac, natural or synthetic resins, and the like. However, wood surfaces which are stained with hydrophilic substances or which contain only minor amounts of hydrophobic materials do not require pretreatment and can be treated directly with the urea-sulfuric acid components in accordance with the methods of this invention. Thus, wood surfaces that are stained with organic or inorganic materials such as dirt, minor amounts of oil, ink, or other chemicals, wood stains, and the like, or which have so-called aged surfaces resulting from exposure and/or oxidation such as that which occurs on exterior redwood and cedar siding, can be treated by the methods of this invention without the necessity of pretreating the surface with surfactants, solvents, or other chemical agents.

The urea-sulfuric acid components employed in the methods of this invention are reaction products of urea and sulfuric acid in which the molar ratio of urea to sulfuric acid is within the range of about $\frac{1}{4}$ to about 7/4. In such components, at least about 25 percent of the sulfuric acid is present as the monourea-sulfuric acid adduct. These components can be employed as melts or as solutions of such mixtures in water or other solvents, and they may contain other components such as surfactants which do not substantially negate the activity of the urea-sulfuric acid component.

The urea-sulfuric acid components may also contain unreacted (free) sulfuric acid or the diurea adduct of sulfuric acid. The suitable and preferred proportions of urea, sulfuric acid, and of the mono- and diurea adducts of sulfuric acid, relative to each other, can be conveniently expressed in terms of the urea/sulfuric acid molar ratio. This ratio will usually be within the range of about $\frac{1}{4}$ to about 7/4, preferably about $\frac{1}{2}$ to about 3/2, and most preferably between about 1/1 to about 3/2. Urea/sulfuric acid molar ratios within the range of about $\frac{1}{4}$ to about 7/4 define compositions in which at least 25 percent of the sulfuric acid is present as the monourea sulfuric acid adduct. Molar ratios within the range of $\frac{1}{2}$ to about 3/2 define compositions in which at least 50 percent of the sulfuric acid is present as the monourea adduct. The most preferred molar ratio range of about 1/1 to about 3/2 defines compositions which contain essentially no uncomplexed sulfuric acid and in which at least 50 percent of the sulfuric acid is present as the monourea-sulfuric acid adduct. The most preferred combinations have urea/sulfuric acid molar ratios of about 1/1. In such compositions, essentially all of the sulfuric acid is present as the monourea-sulfuric acid adduct and such compositions are essentially free of uncomplexed sulfuric acid.

Substantial amounts of uncomplexed sulfuric acid, i.e., sulfuric acid that is not complexed with urea as either the mono- or diurea adduct, are unpreferred since sulfuric acid, when present in substantial amounts, may promote reactions such as oxidation, sulfonation and/or other reactions which can disfigure the surface of a treated wooden article. While excess urea is generally not detrimental to the performance of the urea-sulfuric acid component, the presence of excess urea above the amount required for a urea/sulfuric acid molar ratio of 1/1, results in the conversion of a portion of the monourea-sulfuric acid adduct to the diurea adduct which has little or no activity for ablating wooden articles in accordance with this invention.

Thus, the preferred urea-sulfuric acid components are those in which at least about 75, usually at least about 85, and most preferably at least about 90 percent of the sulfuric acid is present as the mono- and/or diurea-sulfuric acid adduct. Particularly preferred compositions are those that contain essentially no free sulfuric acid; i.e., those in which essentially 100 percent of the sulfuric acid is combined with urea as the mono- and/or diurea adduct. Furthermore, since the monourea adduct is the most active combined form of urea and sulfuric acid, at least about 25, usually at least about 50, preferably at least about 70, and most preferably about 80 to about 100 percent of the sulfuric acid is present as the monourea-sulfuric acid adduct.

The urea-sulfuric acid components can be produced by the reaction of urea and sulfuric acid, and optionally water, by either batch or continuous processes. The more concentrated solutions, i.e., those containing less than 25 weight percent, preferably less than 15 weight percent water, are particularly preferred for purposes of manufacture, storage and shipment. Also, the urea-sulfuric acid component is preferably substantially or completely free of decomposition products of urea and/or sulfuric acid such as sulfamic acid, ammonium sulfamate, ammonium sulfate, etc., to assure that the preferred liquid and solid urea-sulfuric acid components employed in the methods of this invention are also free of such decomposition products. The absence of decomposition products in the urea-sulfuric acid component also assures that the sulfuric acid activity of that component has not been degraded by decomposition. Sulfuric acid decomposition also reduces the amount of acid in the urea-sulfuric acid component available to combine with the urea to form the active monourea-sulfuric acid adduct.

Urea-sulfuric acid components free of decomposition produces can be produced by the reaction of solid urea and .concentrated sulfuric acid by the methods described in my copending application Ser. No. 318,629 filed Nov. 5, 1981, now U.S. Pat No. 4,445,925, the disclosure of which is incorporated herein by reference.

Solid urea-sulfuric acid components useful in producing the solutions employed in the methods of this invention can be obtained by crystallization from their respective aqueous solutions, as described in my copending application Ser. No. 444,667, "Methods for Controlling Vegetation", filed Nov. 26, 1982, the disclosure of which is incorporated herein by reference. Surfactants or other components, when present in the mother liquor, will either crystallize at approximately the same temperature as the urea-sulfuric acid component or will be entrained with the crystallized urea-sulfuric acid component. In the alternative, the surfactant and/or other components can be added, when desired, to the dry or damp urea-sulfuric acid component by any suitable mixing technique after crystallization of the urea-sulfuric acid component from its solution.

As described in my copending application Ser. No. 444,667, the urea-sulfuric acid aqueous solution there referred to as 18-0-0-17 has a crystallization temperature of 50° F. Designations such as 18-0-0-17 are conventionally used in the agricultural industry to define the weight percentages of nitrogen, phosphorus, potassium and a fourth component, in this case sulfur, contained in a composition. Thus, 18-0-0-17 contains 18 weight percent nitrogen as urea, 0 percent phosphorus, 0 percent potassium, and 17 weight percent sulfur. The 18-0-0-17 solution has a urea/sulfuric acid molar ratio of about 1.2 and contains about 90 weight percent of a combination of urea and sulfuric acid. Urea and sulfuric acid, in combination, constitute 80 weight percent of the aqueous solution designated as 10-0-0-19 in copending application Ser. No. 444,667, which composition has a urea/sulfuric acid molar ratio of about 0.6 and which crystallizes at about 42° F. The aqueous solution designated as 9-0-0-25 comprises approximately 96 weight percent of a combination of urea and sulfuric acid, has a urea/sulfuric acid molar ratio of about 0.4, and crystallizes at 14° F.

The indicated crystallization temperatures of the three urea-sulfuric acid aqueous solutions referred to immediately above, and the crystallization temperatures for other formulations of urea and sulfuric acid useful in the methods of this invention, are illustrated, in part, by the isotherms in the ternary phase diagram for urea, sulfuric acid and water in the drawing accompanying copending application Ser. No. 444,667. The crystallization temperatures for other urea-sulfuric acid components useful in the methods of this invention can be determined from that drawing or by cooling the selected solution until crystallization occurs. The crystallized material can be separated from the supernant aqueous phase by any suitable solid-liquid separation technique such as filtration, centrifugation, decanting, and the like, and the recovered damp solid can be dried by evaporation if desired.

The urea-sulfuric acid component is preferably contacted with the wood surface in the presence of at least a minor amount of water. Minor amounts of water accentuate the activity of the urea-sulfuric acid component for ablating wood surfaces and the moisture contained in the wood itself is not always adequate for this purpose. Thus, the urea-sulfuric acid components are preferably contacted with the wood surface in the presence of an amount of water corresponding to at least 5 weight percent of the combined weight of the urea, sulfuric acid and water. Although a portion or all of the water employed can be applied to the wood surface before application of the urea-sulfuric acid component, it is presently preferred that most or all of the water is added with the urea-sulfuric acid component as an aqueous solution thereof.

The preferred aqueous solutions of the urea-sulfuric components useful in the treatment of wooden articles in accordance with this invention, can be either concentrated or very dilute. Although the monourea adduct appears to dissociate to urea and sulfuric acid in solutions containing significantly less than about 0.5 weight percent combined urea and sulfuric acid, the dissociated components can recombine to form the active adduct on the treated wood surface if water is allowed to evaporate. However, very low urea-sulfuric acid component concentrations, e.g., 0.2 percent, or less, generally do not allow for sufficient dosage rates of the active urea-sulfuric acid component to accomplish the desired degree of surface ablation. Thus, urea and sulfuric acid, in combination, will usually constitute at least about 0.5, generally at least about 1, preferably at least about 5, and most preferably at least about 10 weight percent of the aqueous solutions as applied to the wood surface. Even more concentrated solutions of the useful urea-sulfuric acid components are more active for ablating wood surfaces and thus they are more preferred when more extensive or rapid modification of the wood surface is desired. With these factors in mind, the applied solution will usually contain about 0.5 to about 90, normally about 1 to about 90, and preferably about 5 to about 80 weight percent urea and sulfuric acid on a combined weight basis.

The urea-sulfuric acid components employed in the methods of this invention may also contain one or more surfactants. Surfactants increase the activity of the urea-sulfuric acid component toward wood, particularly toward woods that contain and/or are combined with hydrophobic substances such as lignins, waxes, oils and/or other hydrophobic substances. Surfactants also increase the wetting ability of the urea-sulfuric acid component toward wood, and thereby, facilitate the distribution of such components over the treated wood surface.

The selected surfactant is preferably sufficiently chemically stable in the presence of the urea-sulfuric acid component to assure that the surfactant retains its wetting ability for the period of time required to manufacture, store, transport, and apply the composition. The stability of any surfactant can be readily determined by adding an amount of the surfactant to the urea-sulfuric acid component in which it is to be employed, and monitoring the combination by conventional nuclear magnetic resonance (NMR) techniques. NMR can be used to monitor the frequency and magnitude of spectral peaks characteristic of a selected nucleus, e.g., a hydrogen nucleus, in the subject molecule, i.e., in the surfactant. Persistent spectral peak magnitude and frequency over a period of 5 to 6 hours indicate stability. Diminished magnitude or a shift in peak frequency associated with the selected nucleus indicates instability, i.e., that the arrangement of functional groups in the surfactant molecule has been modified.

Illustrative of classes of stable surfactants are nonionics such as the alkylphenol polyethylene oxides, anionics such as the long-chain alkylsulfates, and cationics such as 1-hydroxyethyl-2-heptadecenyl gloxalidin. Of these, the polyethylene oxide nonionic surfactants are particularly preferred. Illustrative of preferred specific surfactants is the nonionic surfactant marketed by Thompson-Hayward, Inc., under the trademark T-MULZ 891.

The surfactant concentration is preferably sufficient to increase the wetting ability of the urea-sulfuric acid component for the wood surface and to assist in the removal of hydrophobic substances such as oils, waxes, lignins, etc. Surfactant concentrations, when employed, will usually be at least about 0.05, generally at least about 0.1, and preferably at least about 0.2 weight percent of the urea-sulfuric acid component as applied. Surfactant concentrations of about 0.2 to about 5 weight percent are adequate in most applications. The concentration of surfactant in the solid urea-sulfuric acid components which also can be employed in this invention should be sufficient to produce the desired concentration in the aqueous solution that is to be produced by contacting the solid with water on the wood surface. For example, a solid urea-sulfuric acid component that is to be dissolved to produce an aqueous solution containing 5 weight percent of a combination of urea and sulfuric acid would be diluted by a factor of 19 to 1 in order to produce that solution. Thus, the solid component should contain approximately 19 times the surfactant concentration desired in the solution on a weight percent basis. Hence, if a surfactant concentration of 0.1 weight percent is desired in the final solution, the solid component should contain approximately 1.9 weight percent of the surfactant.

The solid and liquid urea-sulfuric acid-containing compositions useful in this invention may also contain other components such as organic solvents which facilitate the removal of lignins and other hydrophobic substances and which do not neutralize the sulfuric acid contained in the urea-sulfuric acid component, react with the urea-sulfuric acid component, or otherwise substantially inhibit the activity of the urea-sulfuric acid component toward the wood surface. Illustrative of solvents which can be dissolved in aqueous solutions of the urea-sulfuric acid components useful in this invention are mono- and polyfunctional ketones and/or alcohols having up to 8 carbon atoms per molecule. Illustrative of ketones useful in the urea-sulfuric acid components are acetone and methylethyl ketone. Illustrative alcohols include methanol, ethanol, glycerol, and n-pentanol. Dispersions of hydrocarbon solvents and/or chlorinated solvents can also be formed with the preferred aqueous solutions of the urea-sulfuric acid components useful in the methods of this invention by agitating a mixture of the selected solvent or solvents and the aqueous urea-sulfuric acid component solution under relatively high shear conditions. Illustrative hydrocarbon solvents include hexanes, benzene, toluene, and hydrocarbon blends such as hydrocarbon naphthas. Illustrative chlorinated solvents include mono- and polycholorinated hydrocarbons having up to 10 carbon atoms per molecule such as methylene chloride, chloroform, ethylene dichloride, perchloroethylene, and the like.

The aqueous solutions containing the urea-sulfuric acid component useful in the methods of this invention can be produced by any method capable of mixing the desired components to produce a solution of the desired composition. Thus, the surfactant and/or other components, when used, can be added to the urea-sulfuric acid melt or solution during or immediately after its manufacture, or they can be added to a concentrated or dilute urea-sulfuric acid solution prior to contacting the solution with the wooden article to be treated. Of course, dissolution of the solid compositions useful in this invention, which contain both the urea-sulfuric acid component and the desired optional components, in water, will also produce aqueous solutions useful in this invention.

The methods of this invention involve contacting the wood surface to be treated with the described urea-sulfuric acid component in the presence of an amount of water sufficient to accentuate the activity of the urea-sulfuric acid component toward wood. Contacting should be effected under conditions of contact time, temperature and dosage rate sufficient to accomplish the desired degree of ablation of the surface of the wooden article. The urea-sulfuric acid component can be applied to the wood surface by any procedure capable of accomplishing the required dispersion and contact of the urea-sulfuric acid component with the wood surface. As mentioned above, the urea-sulfuric acid component can be applied as a solution, solid or melt. Illustrative of contacting procedures suitable for contacting solutions and melts with wooden articles are immersion, dipping, painting (e.g., by brush or otherwise), spraying, etc. Anhydrous melts and solid urea-sulfuric acid components can also be employed (although they are less preferred than solutions) and can be applied by distributing the solid over the wood surface to be treated. When anhydrous melts or solids are applied to the wood surface, sufficient water should be added, either before or after application of the urea-sulfuric acid component, to produce a dampened or aqueous urea-sulfuric acid component on the wood surface which contain at least 5 weight percent water.

The urea-sulfuric acid component can be applied to the total surface of the wooden article when treatment of the whole surface is desired. In the alternative, the urea-sulfuric acid component can be selectively applied to desired portions of the article's surface or the article can be masked with a water-impervious, hydrophobic material prior to application of the sulfuric acid component to prevent contact of that component with the protected surface. Illustrative hydrophobic materials suitable for this are fats, oils, waxes, resins, varnishes, paints, etc.

The dosage rate of the urea-sulfuric acid component, i.e., the amount of the component applied per unit surface area of the wooden article, should be sufficient to ablate the wood surface to the extent desired. Dosage rates of the urea-sulfuric acid component will usually be sufficient to cover the treated area, and the active component can be applied to run off if sprayed or painted onto the wood surface. Higher ablation rates, i.e., higher rates of wood surface removal, can be achieved at higher dosage rates, which, in turn, can be achieved by using higher concentrations of the urea-sulfuric acid component. For instance, complete coverage of the wood surface to be treated with a urea-sulfuric acid component solution of a given urea/sulfuric acid ratio in which the urea and sulfuric acid, in combination, constitute 10 weight percent of the solution, will produce a higher ablation rate than will an otherwise identical solution in which the urea and sulfuric acid, in combination, constitute only 5 weight percent of the solution. The highest ablation rates can be achieved with the more concentrated urea-sulfuric acid solutions, e.g., solutions in which the urea and sulfuric acid, in combination, constitute at least about 70 weight of the solution.

Any contacting temperature below the thermal decomposition temperature of the urea-sulfuric acid component which provides a sufficient ablation rate can be employed. The thermal decomposition temperature of the concentrated urea-sulfuric acid components in the presence of water is approximately 176° F. Higher reaction rates can be achieved at higher contacting temperatures although adequate ablation rates usually can be obtained at ambient temperatures. Thus, contacting temperatures will usually be within the range of about 50° to 170° F., preferably within the range of about 60° to about 160° F.

The urea-sulfuric acid component should be contacted with the wood surface for a period of time sufficient to ablate the treated surface to the desired depth. The degree of ablation, i.e., the depth of surface removal, in a given period of time, depends on ablation rate (reaction rate) which, in turn, is a function of the composition of the wood surface, contacting temperature and dosage rate of the urea-sulfuric acid component. The effects of contacting temperature and dosage rate are discussed above. The composition of the treated wood surface affects ablation rate in that so-called hard woods are ablated at a slower rate than are softer woods, and composite articles such as particle board, compressed board and the like are also ablated at a slower rate than are softer woods. The lower ablation rates observed with hard woods and composite articles such as particle board, etc., are apparently due to higher concentrations of hydrophobic substances such as lignins, oils, resins and the like in the article surface. The activity of the urea-sulfuric acid component toward such refractory wood surfaces, can be increased by the use of surfactants and/or solvents. Nevertheless, longer contact times, higher temperatures and/or higher dosage rates are generally required to ablate such surfaces to the same extent that can be achieved with softer woods such as pine and fir under less severe conditions.

Soft woods can be ablated to a detectable extent in relatively short contact times on the order of about one second or more. Longer contact times are required to obtain more substantial modification of soft woods such as that required for shaping and significant surface indentation and to achieve detectable ablation of harder wood surfaces. Thus, the urea-sulfuric acid component should usually be contacted with the wood surface for at least about one second, generally at least about five seconds, and preferably about five seconds to about one hour. Essentially all degrees of wood surface modification can be achieved at contact time within the range of about 5 seconds to about 100 hours by the use of appropriate contacting temperatures and dosage rates.

The treating conditions best suited to a wood surface to a particular depth can be determined by contacting different samples of the wood surface with urea-sulfuric acid components of different composition, at different temperatures and contact times. For instance, four representative samples of the wood can be contacted for five seconds at 70° F. with four different urea-sulfuric acid components having urea/sulfuric acid molar ratios of 1/1 in which the urea and sulfuric acid, in combination, constitute respectively 10, 30, 60 and 90 weight percent of the aqueous solution applied to the wood surface. A second series of four samples of the wood surface can be treated at 70° F. with the same series of urea-sulfuric acid components for 30 seconds, and four series of four samples each can be treated with the same series of urea-sulfuric acid components for 30 seconds at four different temperatures of 60°, 70°, 80° and 100° F., respectively. Further tests of this type can be performed employing different concentrations of surfactants and/or solvents under different conditions of contact time, temperature, urea-sulfuric acid concentration, and urea/sulfuric acid molar ratio to determine the optimum conditions for any given application.

Following completion of the desired treatment, the urea-sulfuric acid component can be allowed to remain on the wood surface where, at least at low dosage rates, the sulfuric acid will ultimately be neutralized by basic components in the wood article such as calcium and sodium salts. However, it is presently preferred that the urea-sulfuric acid component be deactivated and removed from the wood surface by water washing and/or neutralization. The urea-sulfuric acid components and the ablated (dissolved) portion of the wood surface, can be readily removed by washing with excess water. Mild scrubbing of the treated surface facilitates removal of the urea-sulfuric acid component and ablated wood. The urea-sulfuric acid component can also be deactivated by neutralizing the acid with a mineral or organic base. Mineral bases are presently preferred due to their relatively low cost and availability. Illustrative of suitable mineral bases are sodium hydroxide, calcium hydroxide, ammonium hydroxide and ammonia. The base can be applied to the treated surface to neutralize the sulfuric acid in the urea-sulfuric acid component by immersing the wooden article in a solution of the selected base or by painting, spraying, or otherwise applying a solution of the selected base to the treated surface.

Wooden articles, the surfaces of which have been discolored or stained by soiling, aging or otherwise, can be cleaned and restored to their natural wood finish by treatment in accordance with the methods of this invention under relatively mild conditions of dosage rate, contact time, and contacting temperature. For instance, aged redwood and cedar siding and roofing, such as wood shakes and shingles, can be restored to their original surface color by contacting with a urea-sulfuric acid component having a urea/sulfuric acid molar ratio of about 1/1 in which the urea and sulfuric acid, in combination, constitute about 20 weight percent of the applied solution, for 10 minutes at ambient temperature (70° F.). More severe contacting conditions are required to restore harder woods or surfaces that are more heavily stained. Conditions similar to those required to clean and/or restore the surface of soiled or aged wooden articles are also sufficient to lightly emboss, engrave, or texturize wood surfaces and to highlight the grain structure and improve the quality of wood surfaces for finishing and/or adhesion to other substrates. Usually, however, a greater degree of ablation, i.e., surface removal, is desired to produce a more dramatically embossed, engraved or texturized wood surface or to more highly accentuate the grain structure of wooden articles. Illustrative of contacting conditions which can be employed to accomplish these objectives are urea-sulfuric acid concentrations of 60 weight percent or more in the applied solution, surfactant concentrations of about 0.5 to 2 weight percent, contacting temperatures of about 70° F. or higher, and contact times of about 30 minutes or more.

Wooden articles can be embossed by selectively applying the urea-sulfuric acid component to the area of the wooden surface to be removed. Alternatively, the surface to be "raised" or embossed can be masked with a hydrophobic material, and the urea-sulfuric acid component can be applied to the total surface of the wooden article. Selective application of the urea-sulfuric acid component and masking of areas of the wood surface of which ablation is not desired, also can be employed to engrave wooden surfaces. After the treatment is complete, the wax masking (when employed) can be removed by solvent washing. It should also be observed that surfactants contained in the urea-sulfuric acid component may dissolve some otherwise useful masking materials such as light oils and thereby destroy the ability of such masking materials to protect the wood surface. This potential difficulty can be avoided by avoiding the use of high surfactant concentrations with susceptible masking materials or by the use of masking materials that are relatively unaffected by surfactants.

The grain structure of wooden articles which comprise both hard and soft grain, can be accentuated by applying the urea-sulfuric acid component to the total wood surface. The soft grain will be ablated at a faster rate than will the hard grain resulting in apparent elevation of the hard grain structure.

Texturized wood surfaces can be produced by applying the urea-sulfuric acid component to the wood surface in a discontinuous pattern by coarse spraying or other procedure that results in a disperse application of the urea-sulfuric acid component so that only spots or splotches of the surface are contacted with the active component. Alternatively, wood surfaces can be texturized by first splattering or coarsely spraying the wood surface with a hydrophobic material such as paraffin wax followed by a general application of the urea-sulfuric acid component to the overall wood surface. The portion of the wood surface protected by wax will not be ablated, while unprotected portions will be ablated, leaving the protected portion raised after treatment. The protective wax or other hydrophobic coating can then be removed with a suitable solvent.

Relatively mild contacting conditions such as those referred to above with respect to cleaning are also generally sufficient to improve the quality of wood surfaces for finishing or for adhesion to other substrates. The treated wood surface should be washed with sufficient water (mild scrubbing is also preferred) to assure removal of the urea-sulfuric acid component and ablated wood prior to subsequent processing. After the treated article has adequately dried, it can be finished with any one of various known wood coating materials, such as paints, stains, varnishes and resin coatings or impregnants such as phenolic and polyester resins. Similarly, the treated wood surface can be adherred to another substrate such as wood, plastic, metal or other substrate, with a suitable adhesive such as wood glue or synthetic resin adhesives such as epoxy resins, polyester resins, polyterpene resins, phenolic (phenolformaldehyde) resins and the like, to produce laminated structures such as plastic-wood laminates, plywood, or other laminates, composite articles such as butcherblock construction and glue-laminated beams, or to produce structured articles such as furniture or construction joints.

Shaping and milling wood surfaces usually require more severe contacting conditions than are required to clean or emboss woods. For instance, the ablation of $\frac{1}{8}$ inch of milled Douglas fir lumber will require conditions more severe than those required simply to clean or emboss the same surface. Such milling can be achieved by general application to the wood surface of an aqueous solution of the urea-sulfuric acid component containing about 80 weight percent of the combination of urea and sulfuric acid in which the urea/sulfuric acid molar ratio is about 1:1 at 100° F. for about 3 hours or more. Following the selected treating time, the wood surface can be washed and lightly scrubbed to remove ablated wood. Further ablation can be achieved by repeated applications of the urea-sulfuric acid component. Similar treatment conditions can be employed to accomplish significant shaping of wooden articles. Thus, grooves, notches, holes and other shapes can be formed in the surface of wooden articles by application of the urea-sulfuric acid component to the portion of the wood article to be removed under conditions similar to those involved in milling wood surfaces in accordance with this invention.

Accordingly, the methods of this invention can be employed to ablate the surfaces of wooden articles and thus to accomplish any one of a variety of objectives that can be achieved by removing a portion of the surface of wooden articles. For instance, the methods of this invention can be employed to clean, shape, emboss, mill, engrave and/or texturize the surface of wooden articles, to highlight the grain of wood surfaces and/or to improve the quality of wood surfaces for subsequent finishing or adhesion to other materials. These objectives can be achieved by the methods of this invention without the need for cumbersome and sometimes complicated mechanical equipment which is otherwise required to accomplish similar modification of wood surfaces. Furthermore, the methods of this invention eliminate many of the deficiencies and detrimental side effects associated with other chemical treatments such as surfactant and solvent cleaning and/or treatment with strong mineral acids. The urea-sulfuric acid components are non-volatile; thus they do not produce toxic vapors characteristic of solvent treatments. They are relatively non-corrosive to machinery and animal tissue and therefore do not present the hazards of corrosivity associated with strong acids and caustics. They do not char or otherwise disfigure treated wood surfaces by chemical side reactions characteristic of strong acids such as sulfuric, nitric and hydrochloric acids.

The invention is further described by the following examples which are illustrative of specific modes of practicing the invention and are not intended as limiting the scope of the invention as defined by the appended claims.

EXAMPLE I

A portion of the major surface of a Douglas fir plank measuring 1-inch by 12 inches by 4 feet, cut with the grain so that the grain is parallel to the major surfaces of the plank, can be ablated by contacting the surface with an aqueous solution containing a urea-sulfuric acid component having a urea/sulfuric acid molar ratio of $\frac{1}{2}$ in which the urea and sulfuric acid, in combination, constitute 50 weight percent of the solution. The solution is applied at a dosage rate sufficient to saturate the treated surface of the plank and is maintained in contact with the plank at a temperature of 70° F. for 5 minutes. The treated surface of the plank is then washed with water and lightly scrubbed to remove ablated wood.

EXAMPLE II

Age-darkened redwood siding is restored to a new surface finish by saturating the exposed surface of the siding with an aqueous solution of a urea-sulfuric acid component having a urea/sulfuric acid molar ratio of 1.2 in which the urea and sulfuric acid, in combination, constitute 80 weight percent of the solution. The exposed surface is maintained in contact with the urea-sulfuric acid solution for a period of one hour at a temperature of 70° F. after which the treated surface is water washed and scrubbed lightly to remove the ablated, stained surface wood.

EXAMPLE III

Four, clean 1/16-inch thick, 4-foot by 8-foot white pine panels, two cut with the grain parallel to the major axis and two with the grain at 90° to the major axis, are prepared for fabrication into a composite ¼-inch plywood board 4 feet by 8 feet, by applying to the surfaces of each panel which are to be adherred to an opposing panel an amount of a urea-sulfuric acid component having a molar ratio of 3/2 sufficient to saturate the treated surface. The urea and sulfuric acid, in combination, constitute 30 weight percent of the urea-sulfuric acid solution, and the solution is maintained in contact with the treated surfaces for 10 minutes at 80° F. The treated surfaces are then washed with a high pressured spray to remove the urea-sulfuric acid component and ablated wood and are allowed to dry. The dried panels are then glued and assembled so that the wood-grain direction alternates between adjacent panels, pressed and cured to obtain a ¼-inch thick 4-foot by 8-foot plywood composite.

EXAMPLE IV

The grain structure of one major surface of an oak plank 1-inch by 6 inches by 2 feet cut cross-grain so that the grain ends are exposed at major surfaces is highlighted by saturating the surface with an aqueous solution of a urea-sulfuric acid component having urea/sulfuric acid molar ratio of 1/1 in which the urea and sulfuric acid, in combination, constitute 50 percent of the solution. The solution also contains 0.5 weight percent of the nonionic surfactant marketed by Thompson-Hayward, Inc., under the trademark T-MULZ 891. The urea-sulfuric acid component solution is maintained in contact with the surface at 70° F. for 30 minutes after which the treated surface is washed with a water spray to remove the urea-sulfuric acid component and ablated wood. The resulting article has one major surface on which the soft wood grain has been removed to a greater extent than has the hard wood grain giving the hard grain a high-lighted appearance.

EXAMPLE V

One major surface of a 1-inch by 8-inch by 4-foot clear pine plank is texturized by first applying molten paraffin wax to the surface to be treated in an irregular pattern by coarse spray and allowing the paraffin wax to cool and set to develop an irregular masking pattern on the plank surface. The resulting surface is then sprayed with an aqueous solution of a urea-sulfuric acid component having a urea/sulfuric acid molar ratio of ½ in which the urea and sulfuric acid, in combination, constitute 30 weight percent of the solution. The solution also contains 0.5 weight percent of T-MULZ 891 brand surfactant. This solution is maintained in contact with the surface at 70° for 10 minutes. The treated surface is then washed with water to remove the urea-sulfuric acid component and is then washed with solvent to remove the paraffin wax masking material to yield a texturized surface.

EXAMPLE VI

The letter M is embossed in a 1-inch by 8-inch by 2-foot maple plank by masking an area in the center of the plank corresponding to the letter M measuring 6 inches by 6 inches in its major dimensions with hot paraffin wax. The paraffin wax is allowed to cool and set and the board surface is then sprayed to saturation with an aqueous urea-sulfuric acid solution having a urea/sulfuric acid molar ratio of 1/1 in which the urea and sulfuric acid, in combination, constitute 70 weight percent of the solution. The solution also contains 1 weight percent T-MULZ 891 brand surfactant, 10 weight percent ethanol and 19 weight percent water. This solution is maintained in contact with the treated surface at a temperature of 80° F. for 30 minutes after which the surface is spray-washed with water and scrubbed to remove residual urea-sulfuric acid component and ablated wood. The paraffin wax masking over the letter M is then removed by solvent washing to yield a plank having an embossed letter M on its surface.

EXAMPLE VII

A series of separated ½-inch wide rings are formed on a 1-inch diameter white pine dowel by first masking alternate ½-inch wide sections of the dowel separated by ½-inch unmasked sections with paraffin wax. The unmasked portions of the dowel are then saturated with an aqueous solution of a urea-sulfuric acid component having a urea/sulfuric acid molar ratio of 1/1 in which the urea and sulfuric acid, in combination, constitute 60 weight percent of the solution. The urea-sulfuric acid solution is maintained in contact with the exposed portions of the dowel for a period of 30 minutes at 70° F. after which the dowel is washed and lightly scrubbed to remove the urea-sulfuric acid component and ablated wood. This procedure is repeated two more times after which the paraffin wax masking is removed by solvent washing to produce a dowel having alternating one-half inch wide rings about its circumference.

While particular embodiments of the invention have been described, it will be understood, of course, that the invention is not limited thereto since many obvious modifications can be made and it is intended to include within this invention any such modifications as will fall within the scope of the appended claims.

Having described my invention, I claim:

1. A method for treating the surface of a wooden article, which method comprises contacting said surface with a composition comprising the monourea adduct of sulfuric acid under conditions of contact time, dosage rate of said composition, and contact temperature sufficient to ablate at least a portion of the contacted surface of said wooden article.

2. The method defined in claim 1 wherein said composition comprises an aqueous solution of said monourea adduct, in which solution the concentration of urea and sulfuric acid, in combination, corresponds to at least 0.5 weight percent of said solution, and said solution is contacted with said surface at a temperature and for a period of time sufficient to ablate a portion of the surface of said wooden article.

3. The method defined in claim 1 which further comprises the step of deactivating said monourea adduct of sulfuric acid following the completion of said contacting.

4. The method defined in claim 3 wherein said monourea adduct of sulfuric acid is deactivated by contacting the treated surface of said article with a member selected from the group consisting of (1) an amount of a basic substance sufficient to neutralize the sulfuric acid contained in said composition and (2) a sufficient amount of water to wash said monourea adduct from the surface of said article, and (3) combinations of (1) and (2).

5. The method defined in claim 1 wherein a portion of the surface of said article is masked with a coating of a hydrophobic material prior to contacting said surface of said wooden article with said monourea adduct of sulfuric acid.

6. The method defined in claim 2 wherein the molar ratio of said urea to said sulfuric acid is within the range of about ¼ to about 7/4, and said aqueous solution is contacted with the surface of said wooden article at a temperature of about 50° to about 170° F. and below the incipient decomposition temperature of said monourea adduct of sulfuric acid for a period of at least about one second.

7. The method defined in claim 1 wherein said composition comprises an aqueous solution of urea and sulfuric acid in which said urea and said sulfuric acid, in combination, constitute about 5 to about 90 weight percent of said solution, the molar ratio of said urea to said sulfuric acid is within the range of about ½ to about 3/2, and said aqueous solution is contacted with said surface of said wooden article at a temperature of about 50° to about 170° F.

8. The method defined in claim 1 wherein said wooden article is selected from the group consisting of new and used manufactured wooden articles.

9. The method defined in claim 1 wherein the surface of said wooden article is stained, and said stained surface is contacted with said monourea adduct of sulfuric acid under conditions sufficient to at least partially remove said stain from said surface.

10. The method defined in claim 1 wherein the wood in said wooden article comprises hard grain and soft grain, and said surface of said wooden article is contacted with said monourea adduct of sulfuric acid under conditions sufficient to remove at least a portion of said soft grain wood and accentuate said hard grain wood.

11. The method defined in claim 1 wherein the resulting treated surface of said wooden article is adherred to the surface of another article with an adhesive after said treatment with said monourea adduct of sulfuric acid.

12. The method defined in claim 1 wherein the resulting treated surface of said wooden article is coated with a wood-coating material after said treatment with said monourea adduct of sulfuric acid.

13. The method defined in claim 12 wherein said wood-coating material is selected from the group consisting of paint, wood stain, varnish, and resin coatings.

14. The method defined in claim 1 wherein said composition comprises an aqueous solution of urea and sulfuric acid in which the molar ratio of said urea to said sulfuric acid is within the range of about ¼ to about 7/4, and said aqueous solution further comprises a surfactant.

15. A method for ablating at least a portion of the surface of a manufactured wooden article, which method comprises contacting the surface of said article with an aqueous solution comprising urea and sulfuric acid under conditions of contact time, dosage rate of said aqueous solution, and contact temperature sufficient to ablate at least a portion of said surface of said manufactured wooden article wherein said urea and sulfuric acid, in combination, constitute at least about 2 weight percent of said solution, and the molar ratio of said urea to said sulfuric acid is within the range of about ¼ to about 7/4.

16. The method defined in claim 15 wherein said molar ratio of said urea to said sulfuric acid is within the range of about ½ to about 3/2.

17. A method for cleaning the surface of a manufactured wooden article, which method comprises the steps of contacting said surface of said wooden article with an aqueous solution comprising urea and sulfuric acid under conditions of contact time, dosage rate of said aqueous solution, and contact temperature sufficient to ablate at least a portion of said surface of said manufactured wooden article wherein said urea and said sulfuric acid, in combination, constitute at least about 2 weight percent of said solution, and the molar ratio of said urea to said sulfuric acid is within the range of about ¼ to about 7/4.

18. The method defined in claim 17 wherein said molar ratio of said urea to said sufuric acid is within the range of about ½ to about 3/2.

19. The method defined in claim 17 wherein said aqueous solution further comprises a surfactant.

* * * * *